(12) United States Patent
Ghiya et al.

(10) Patent No.: US 7,634,765 B2
(45) Date of Patent: Dec. 15, 2009

(54) METHODS AND APPARATUS TO REDUCE A CONTROL FLOW GRAPH USING POINTS-TO INFORMATION

(75) Inventors: Rakesh Ghiya, Santa Clara, CA (US); Robert J. Cox, Mountain View, CA (US); David C. Sehr, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1252 days.

(21) Appl. No.: 10/927,672

(22) Filed: Aug. 27, 2004

(65) Prior Publication Data

US 2006/0047681 A1    Mar. 2, 2006

(51) Int. Cl.
*G06F 9/45* (2006.01)
(52) U.S. Cl. .................................................. 717/140
(58) Field of Classification Search .................. 717/140
See application file for complete search history.

(56) References Cited

U.S. PATENT DOCUMENTS

| | | | |
|---|---|---|---|
| 6,381,739 B1* | 4/2002 | Breternitz et al. | 714/37 |
| 7,100,164 B1* | 8/2006 | Edwards | 718/108 |
| 2002/0035722 A1* | 3/2002 | Mckinsey et al. | 717/5 |
| 2002/0092005 A1* | 7/2002 | Scales | 717/162 |
| 2003/0233640 A1* | 12/2003 | Reynaud | 717/154 |
| 2004/0243982 A1* | 12/2004 | Robison | 717/132 |
| 2006/0190934 A1* | 8/2006 | Kielstra et al. | 717/148 |

* cited by examiner

*Primary Examiner*—John Chavis
(74) *Attorney, Agent, or Firm*—Hanley, Flight & Zimmerman, LLC

(57) ABSTRACT

Methods and apparatus for reducing a control flow graph are disclosed. A disclosed method comprises: creating a points-to set associated with a function in a computer program; determining if a control flow edge between: (1) a call-site associated with a restore and return instruction and (2) a successor block following the call-site is removable from a control flow graph representing the computer program; and removing the control flow edge if it is determined that the control flow edge is removable.

25 Claims, 9 Drawing Sheets

100 ⟶

```
int foo(jmp_buf env_foo)
{
    if (cond)
    {
        longjmp(env_foo, 1);  ⟵ 114
    }
    return;
} int bar (jmp_buf env_bar1, jmp_buf env_bar2)
{
    if (cond_A)
    {
        longjmp(env_bar1, 1);  ⟵ 118
    }
    if (cond_B)
    {
        longjmp(env_bar2, 1);  ⟵ 120
    }
}

Main()
{
    jmp_buf envA, envB;        ⟵ 106, 108
    j = setjmp(envA);          ⟵ 102
    if (j!=0)                  ⟵ 116
    {
        printf("Arrival through longjmp");
        return;
    } k = setjmp(envB);          ⟵ 104
    if (k!=0)                  ⟵ 122
    {
        printf("Arrival through longjmp");
        return;
    } foo(envA);                 ⟵ 110
    bar(envA, envB);           ⟵ 112 return;
}
```

FIG. 1

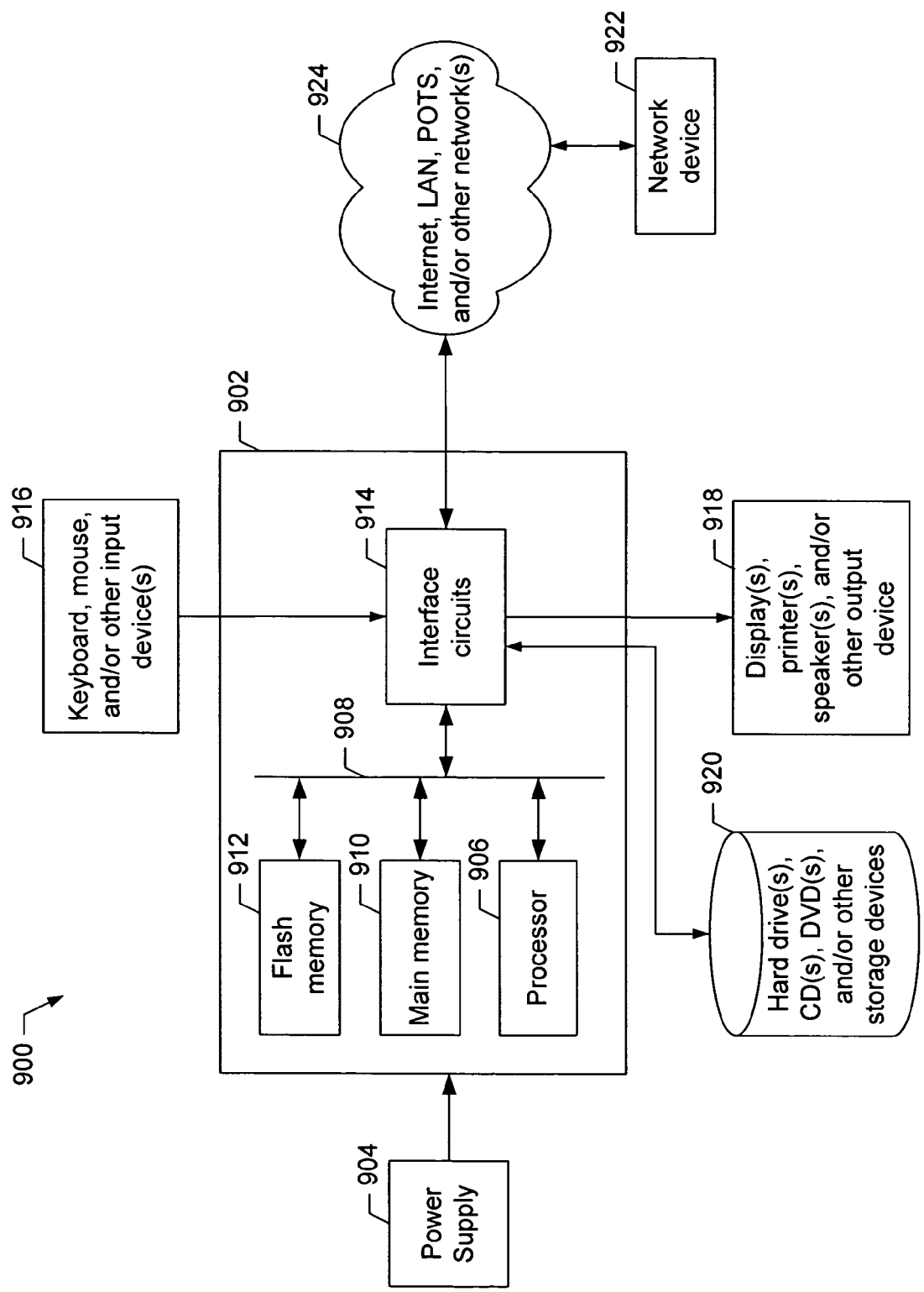

US 7,634,765 B2

METHODS AND APPARATUS TO REDUCE A CONTROL FLOW GRAPH USING POINTS-TO INFORMATION

TECHNICAL FIELD

The present disclosure pertains to compilers and, more particularly, to methods and apparatus to reduce a control flow graph.

BACKGROUND

Modern day compilers create data structures such as, for example, a control flow graph to represent the program instructions to be compiled and/or optimized by the compiler. The control flow graph includes nodes and directed edges. Each node represents a basic block (e.g., a straight-line (i.e., sequential) segment of program instructions without any jumps or jump targets in the middle of the segment). The directed edges of the control flow graph represent jumps and/or transitions from a first basic block to a second basic block in the program instructions. Jumps may be a function call, a conditional statement, etc.

Typical compilers will create a control flow graph using a conservative approach in the presence of instructions used to bypass standard function call and return procedures (e.g., return instructions) such as a setjmp and/or a longjmp instruction in the C programming language. The setjmp and longjmp instructions are used in pairs to enable repeat execution of code with the same program state. More specifically, the setjmp instruction is used to save a runtime environment (e.g., values of variables, object values, stack pointer value, and register values) in a setjmp buffer. The longjmp instruction is used to restore the runtime environment saved in the setjmp buffer by the corresponding setjmp instruction and to return control to the instruction immediately following the setjmp instruction such that the instruction following the setjmp instruction executes in the restored runtime environment. The argument of a longjmp instruction is a pointer which references a setjmp buffer that stores the runtime environment the longjmp instruction is to restore. (The setjmp/longjmp approach is, in some respects, more useful then using a traditional goto statement. For instance, a goto statement is limited to affecting a local jump whereas a longjmp instruction may be used for a non-local jump.)

The conservative approach used by typical compilers generally assumes that any function call reachable from a setjmp instruction may return control to the program instruction following the setjmp instruction. In other words, the conservative approach assumes: (1) that every function that may be executed after a setjmp instruction has been executed may contain a longjmp instruction, and (2) the function may return control to the basic block following the setjmp instruction (e.g., a successor block). This conservative approach results in extraneous directed edges in the control flow graph. The extraneous directed edges may have an effect on the amount of optimization a compiler may perform.

BRIEF DESCRIPTION OF THE DRAWINGS

FIG. 1 is a listing of an example program containing setjmp and longjmp instructions.

FIG. 9 is a block diagram of an example computer system which may execute the machine accessible instructions represented by the flowcharts of FIGS. 4, 5, 6, and/or 7 to implement the apparatus of FIG. 3.

DETAILED DESCRIPTION

Figure 2:
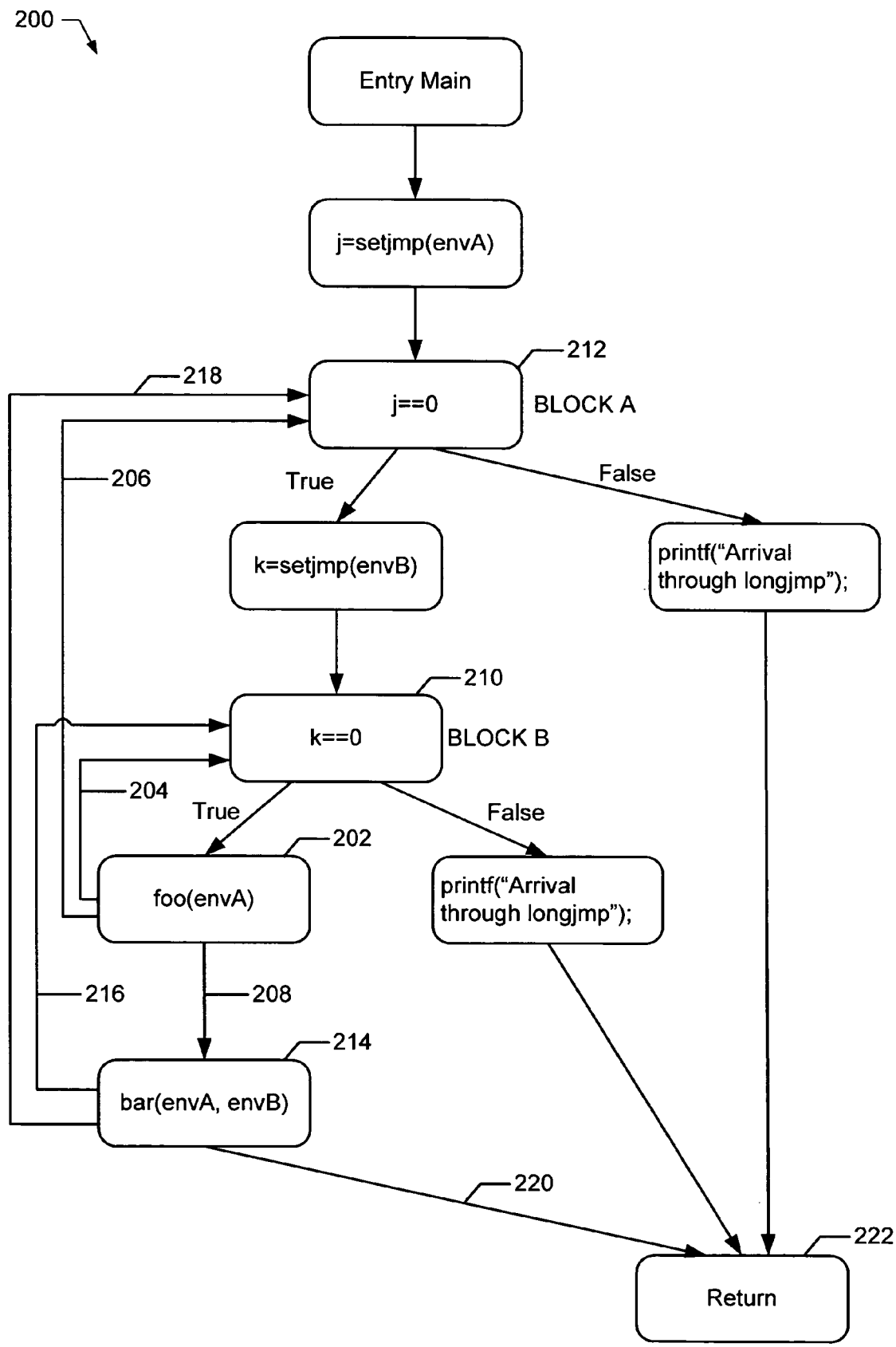
FIG. 2 is an example control flow graph that may be created by a known compiler to represent the function main( ) of FIG. 1.

Although, for purposes of illustration, the following discussion frequently refers to longjmp instructions, persons of ordinary skill in the art will appreciate that any other type of instruction that restores a runtime environment and directs control to a predetermined code location (possibly by bypassing standard function calls and return procedures) may also be processed by the methods and apparatus disclosed herein. Therefore, the term restore and return instruction" will be used in this patent to refer to a longjmp instruction or any other type of instruction that restores a runtime environment and returns control to a code location. Persons of ordinary skill in the art will further appreciate that any reference to a longjmp instruction in the following description and figures is made for purposes of illustrating a specific example of a restore and return instruction, not to exclude the possibility of using the disclosed methods and apparatus with other possible restore and return instructions.

FIG. 1 represents an example program 100 containing setjmp and longjmp instructions. The function main( ) includes two setjmp instructions 102, 104. Execution of the first setjmp instruction 102 causes a first runtime environment to be stored in a first setjmp buffer envA 106. Execution of the second setjmp instruction 102 causes a second runtime environment to be stored in a second setjmp buffer envB 108. The setjmp buffers 106, 108 are specified by function arguments in their corresponding setjmp instructions. The two setjmp buffers envA 106, envB 108 store and/or save the runtime environment that is active when their corresponding setjmp instruction 102, 104 is executed. For example, when the setjmp instruction 102 is executed, the runtime environment present at that time is saved in the setjmp buffer envA 106. Similarly, when the setjmp instruction 104 is executed, the runtime environment present at that time is saved in the setjmp buffer envB 108. The setjmp buffers envA, envB may contain the values of the stack pointer, variables, and/or the registers as of the time their corresponding setjmp instructions 102, 104 are executed.

In the example of FIG. 1, the function main( ) also has two call-sites, namely, a call-site 110 to execute foo( ) and a call-site 112 to execute bar( ). The call-site 110 invokes foo( ) with the setjmp buffer envA 106 as an argument and, therefore, a longjmp instruction 114 in foo( ) uses a pointer to the runtime environment stored in the setjmp buffer envA 106 as an argument. (The argument of a longjmp instruction is referred to herein as a setjmp buffer pointer.) The longjmp instruction 114 may be executed to restore the runtime environment stored in the setjmp buffer envA 106 and to return program execution to a basic block 116 (e.g., the successor block associated with the setjmp instruction 102 that caused the runtime environment to be stored in the setjmp buffer envA). The call-site 112 invokes function bar( ) with the setjmp buffer envA 106 and the setjmp buffer envB 108 as arguments. A person of ordinary skill in the art will readily appreciate that a longjmp instruction 118 within the function bar( ) uses a pointer to the setjmp buffer envA 106 as its argument, and a longjmp instruction 120 within the function bar( ) uses a pointer to the setjmp buffer envB 108 as its argument. The longjmp instruction 118 may be executed to restore the runtime environment stored in the setjmp buffer envA 106 and to return program execution to the basic block 116 (e.g., a successor block associated with the setjmp instruction 102), and the longjmp instruction 120 may be executed to restore the runtime environment stored in the setjmp buffer envB 108 and to return program execution to a basic block 122 (e.g., a successor block associated with the setjmp instruction 104).

FIG. 2 is a control flow graph 200 that may be created by a known compiler to represent the function main( ) of FIG. 1. Each node of the control flow graph 200 represents a basic block of main( ). For example, the node 202 represents the call-site 110 to invoke foo( ). Each directed edge (e.g., each control flow edge) of the control flow graph 200 represents a possible instruction execution path and/or a jump instruction. An example directed edge is the directed edge 208 that indicates control may advance to a node 214 (e.g., the call-site 112) after foo( ) is executed. Methods to generate the control flow graph 200 of FIG. 2 are well known in the art and are not described herein.

The control flow graph 200 includes the node 202 that has three directed edges (e.g., directed edges 204, 206, 208) used to represent the possible paths of execution after foo( ) is executed. The directed edge 204 indicates the node 202 may return control to node 210 where the node 210 represents the basic block 122 of FIG. 1. The directed edge 206 indicates the node 202 may return control to a node 212 (e.g., the basic block 116 of FIG. 1) if the longjmp instruction 114 of FIG. 1 is executed. The directed edge 208 indicates control may advance from node 202 to the node 214 (e.g., the call-site 112 of FIG. 1) if the longjmp instruction 114 of FIG. 1 is not executed and foo( ) returns using standard return procedures. A person of ordinary skill in the art will readily appreciate that in some examples only two of the directed edges 206, 208 may actually be executed by the program, and that the directed edge 204 is generated because the known compiler assumes any function call reachable from the setjmp instruction 104 of FIG. 1 may return control to the successor block associated with the setjmp instruction (e.g., the basic block 122). In other words, the directed edge 204 is generated by a known compiler because the known compiler assumes the call-site 110 may, in theory, return control to the successor block of the setjmp instruction 104.

The node 214 also has three directed edges (e.g., directed edges 216, 218, 220) that represent the different paths of execution after bar( ) executes. The directed edge 216 indicates control may advance from the node 214 to the node 210 (e.g., the basic block 122 of FIG. 1) if the longjmp instruction 118 of FIG. 1 is executed. The directed edge 218 indicates control may advance from the node 214 to the node 212 (e.g., the basic block 116 of FIG. 1) if the longjmp instruction 120 of FIG. 1 is executed. The directed edge 220 indicates the node 214 may return control to a node 222 if neither the longjmp instruction 118 nor the longjmp instruction 120 is executed and bar( ) returns using standard return procedures.

Figure 3:
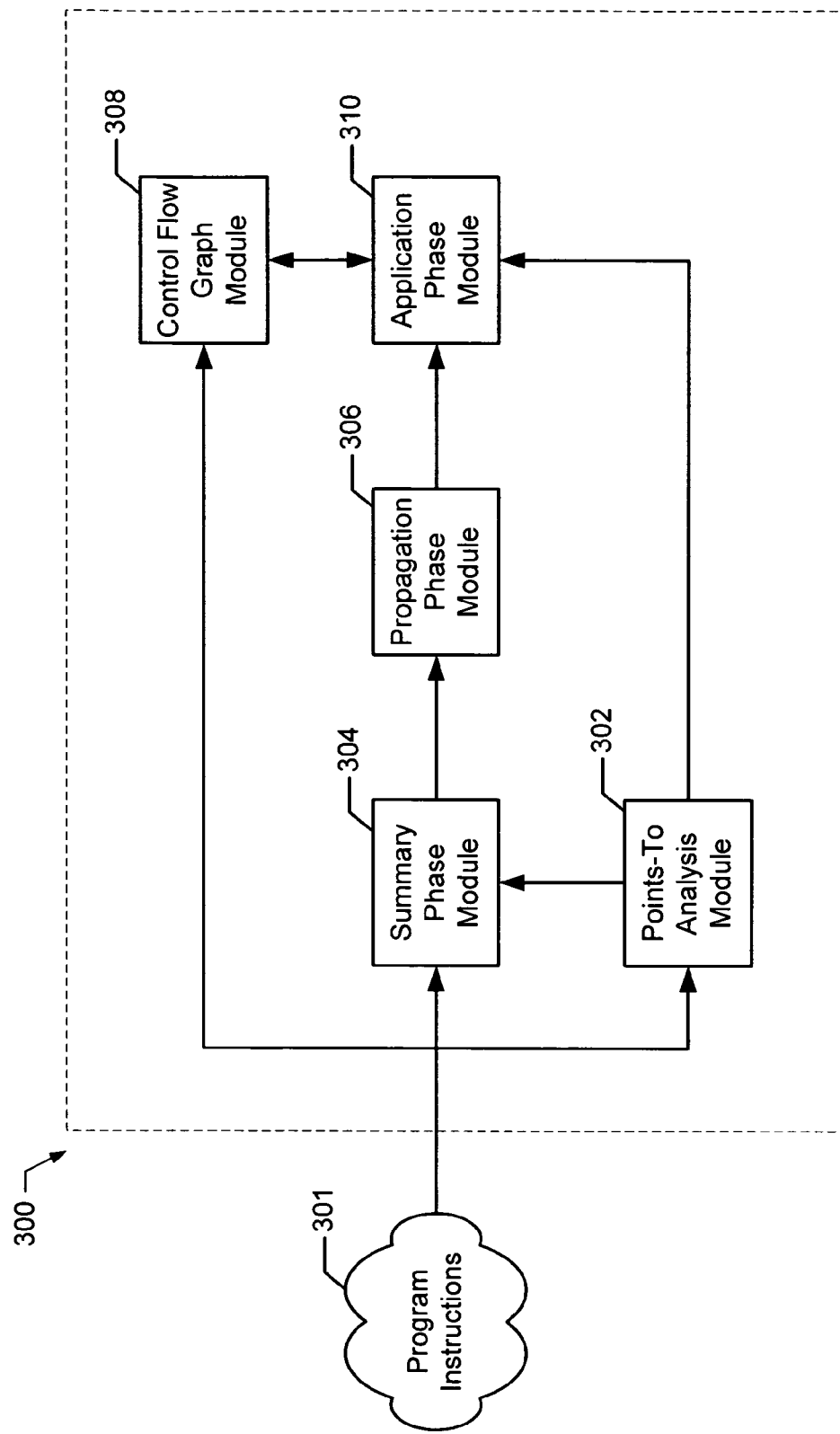
FIG. 3 is a block diagram of an example embodiment of the invention for creating a reduced control flow graph.

FIG. 3 is a block diagram of an example apparatus 300 for reducing a control flow graph such as the example control flow graph 200 of FIG. 2. The apparatus 300 may be implemented as several components of hardware each configured to perform one or more functions, may be implemented in software and/or firmware where one or more programs are used to perform the different functions, or may be a combination of hardware, firmware, and/or software. In this example, the apparatus 300 includes a points-to analysis module 302, a summary phase module 304, a propagation phase module 306, a control flow graph module 308, and an application phase module 310 which operate upon a set of program instructions 301.

The points-to analysis module 302 is configured to receive the set of program instructions 301 from a compiler and to perform a points-to analysis on the program instructions. Specifically, the example points-to analysis module 302 examines memory references in the set of program instructions 301 and identifies the objects and/or memory locations the pointers are referencing. For example, the points-to analysis module 302 may determine the setjmp buffer pointer env_bar1 references the runtime environment stored in setjmp buffer envA. The points-to analysis module 302 is configured to store the results of the points-to analysis and to provide the results to the summary phase module 304 and/or the application phase module 310. The summary phase module 304 may query the points-to analysis module 302 for the results of the points-to analysis and/or the points-to analysis module 302 may store the results in a memory location accessible to the summary phase module 304, the propagation phase module 306, and/or the application phase module 310.

The summary phase module 304 is configured to analyze: (1) each function in the set of program instructions 301 and (2) call-site(s) within each function that restore a runtime environment and bypass standard function calls and return procedures (e.g., each restore and return instruction such as a longjmp instruction). The summary phase module 304 examines each function within the set of program instructions 301 and uses the points-to analysis results generated by the points-to analysis module 302 to determine the runtime environment associated with each restore and return instruction (e.g., the runtime environment restored by each longjmp instruction). The summary phase module 304 of FIG. 3 generates a data structure (e.g., a points-to set) for each function in the set of program instructions 301 and stores the runtime environment(s) associated with each restore and return instruction (e.g., each longjmp instruction) within the function in the corresponding points-to set. For example, the summary phase module 304 may analyze the function bar( ) of FIG. 1, and determine that the runtime environments restored by longjmp instructions 118, 120 are the runtime environment stored in the setjmp buffer envA 106 and the runtime environment stored in the setjmp buffer envB 108. The summary phase module 304 thus stores the contents of the setjmp buffers 106, 108 in the points-to set for the function bar( ). In other words, the points-to set bar.longjmp_pt_set" for the function bar( ) is modified in accordance with the following equation: bar.longjmp_pt_set={the setjmp buffer envA 106 and the setjmp buffer envB 108}). The resulting points-to sets may be passed to the propagation phase module 306 and/or the application phase module 310. Alternatively, the points-to sets may be stored in a memory location accessible to the propagation phase module 306 and/or the application phase module 310.

The propagation phase module 306 of FIG. 3 is configured to analyze: (1) each function in the set of program instructions 301 and (2) each call-site within each function that is not a restore and return instruction (e.g., instructions that are not longjmp instructions). Each call-site that is not a restore and return instruction within a function in the set of program instructions 301 is analyzed. The propagation phase module 306 determines the runtime environment(s) that may be restored by these call-sites and modifies the points-to sets generated by the summary phase module 304 to include the runtime environment(s) that may be restored from the call-sites that are not restore and return instructions. For example, the propagation phase module 306 may analyze the function main( ) of FIG. 1 and determine the runtime environments that may be restored by the call-sites 110, 112 are the runtime environment stored in the setjmp buffer envA 106 and the runtime environment stored in the setjmp buffer envB 108. In such circumstances, the illustrated propagation phase module 306 updates the points-to set created by the summary phase module 304 for the function main( ) to include the setjmp buffers containing the runtime environments restored by the call-sites within the function.

The control flow graph module 308 of FIG. 3 is configured to receive the set of program instructions 301 and to generate a control flow graph. Persons of ordinary skill in the art will readily appreciate that control flow graphs and methods and apparatus to generate control flow graphs are well known in the art. Any known method may be used by the control flow graph module 308 to generate the control flow graph. However, unlike prior art methods and apparatus, the control flow graph module 308 is configured to reduce and/or optimize the control flow graph based on instructions from the application phase module 310. For example, the application phase module 310 may determine a directed edge is unnecessary and instruct the control flow graph module 308 to remove the directed edge from the control flow graph.

To this end, the application phase module 310 of FIG. 3 is configured to analyze the control flow graph generated by the control flow graph module 308 and the results of the points-to analysis to determine if the control flow graph is to be reduced and/or optimized. The application phase module 310 analyzes (1) each function in the set of program instructions 301 and (2) each call-site within the function that may invoke a restore and return instruction (e.g., a longjmp instruction). The application phase module 310 determines if a directed edge (e.g., a control flow edge) exists between a call-site and the successor blocks associated with the restore and return instructions in the function. As explained in detail below, if a directed edge exists between a call-site and a successor block, the application phase module 310 determines if the directed edge can be deleted and/or removed. The application phase module 310 is configured to send instructions to the control flow graph module 308 to delete and/or remove unnecessary directed edges from the control flow graph.

Figure 4:
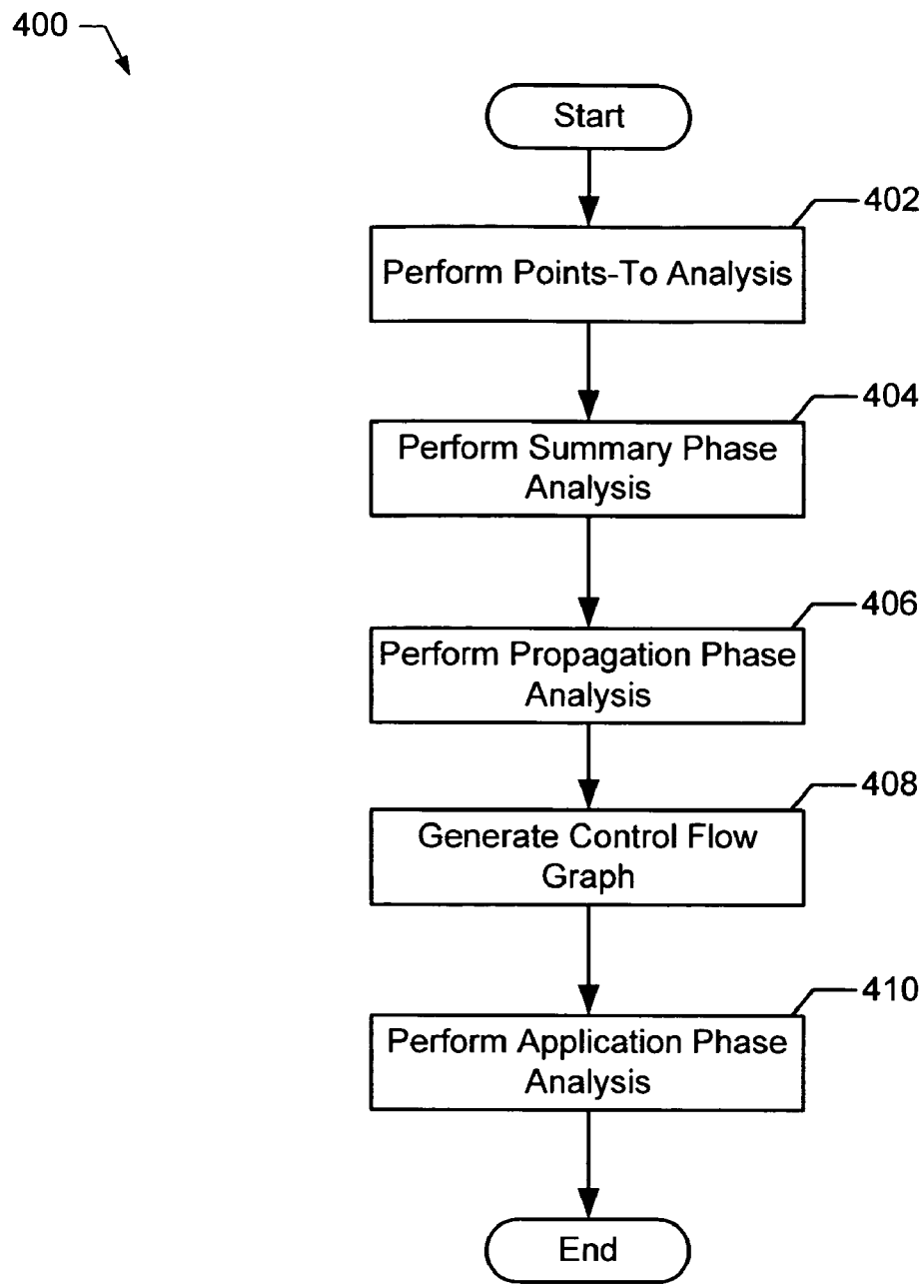
FIG. 4 is a flowchart representative of example machine accessible instructions which may be executed by a device to implement the example system of FIG. 3.

A flowchart representative of example machine accessible instructions for implementing the apparatus 300 of FIG. 3 is shown in FIG. 4. In this example, the machine accessible instructions comprise a program for execution by a processor such as the processor 906 shown in the example computer 900 discussed below in connection with FIG. 9. The program may be embodied in software stored on a tangible medium such as a CD-ROM, a floppy disk, a hard drive, a digital versatile disk (DVD), or a memory associated with the processor 906, but persons of ordinary skill in the art will readily appreciate that the entire program and/or parts thereof could alternatively be executed by a device other than the processor 906 and/or embodied in firmware or dedicated hardware in a well known manner. For example, any or all of the points-to analysis module 302, the summary phase module 304, the propagation phase module 306, the control flow graph module 308, and the application phase module 310 could be implemented by software, hardware, and/or firmware. Further, although the example program is described with reference to the flowchart illustrated in FIG. 4, persons of ordinary skill in the art will readily appreciate that many other methods of implementing the example program 400 may alternatively be used. For example, the order of execution of the blocks may be changed, and/or some of the blocks described may be changed, eliminated, or combined.

The example process 400 of FIG. 4 begins when a software program comprising a set of program instructions 301 is received. The points-to analysis module 302 analyzes the set of program instructions 301 to determine the objects and/or the locations in memory that are referenced by pointers and other similar software constructs in the set of program instructions 301. The results of the points-to analysis are passed to the summary phase module 304 and used to generate a plurality of points-to sets identifying the runtime environment(s) associated with restore and return instruction(s) (e.g., longjmp instruction(s)) within the set of program instructions 301. After the summary phase module 304 generates the points-to sets identifying the runtime environment(s) associated with the restore and return instruction(s), a propagation phase begins. During the propagation phase, the propagation phase module 306 analyzes each call-site in the functions contained in the set of program instructions 301 and identifies the runtime environment(s) that may be restored by the call-sites. The identified runtime environment(s) are added to the corresponding points-to sets.

After each call-site has been analyzed in each of the functions in the set of program instructions 301, an application phase begins. During the application phase, a control flow graph is generated by the control flow graph module 308. The generated control flow graph 308 is passed to the application phase module 310. The application phase module 310 uses the results of the points-to analysis and the propagation phase to determine if the control flow graph may be reduced and/or optimized by the control flow graph module 308.

Turning specifically to FIG. 4, the example process 400 begins when a software program comprising of a set of program instructions 301 is received. The points-to analysis module 302 performs a points-to analysis on the set of program instructions 301 (block 402). In particular, the points-to analysis module 302 analyzes memory references in the set of program instructions 301 such as pointers and determines the objects and/or memory locations the pointers are referencing. For example, the points-to analysis module 302 may determine the setjmp buffer pointer env_foo points to the runtime environment stored in the setjmp buffer envA 106. The results of the points-to analysis are stored for later use and/or are passed to the summary phase module 304, the propagation phase module 306, and/or the application phase module 310.

The summary phase module 304 receives the results of the points-to analysis and the set of program instructions 301 and begins the summary phase analysis (block 404). The summary phase analysis creates a points-to set (*.function.. longjmp_pt_set, where *.function" is a variable representative of a function name) for each function in the program instructions 301. An example summary phase analysis is shown in FIG. 5.

Figure 5:
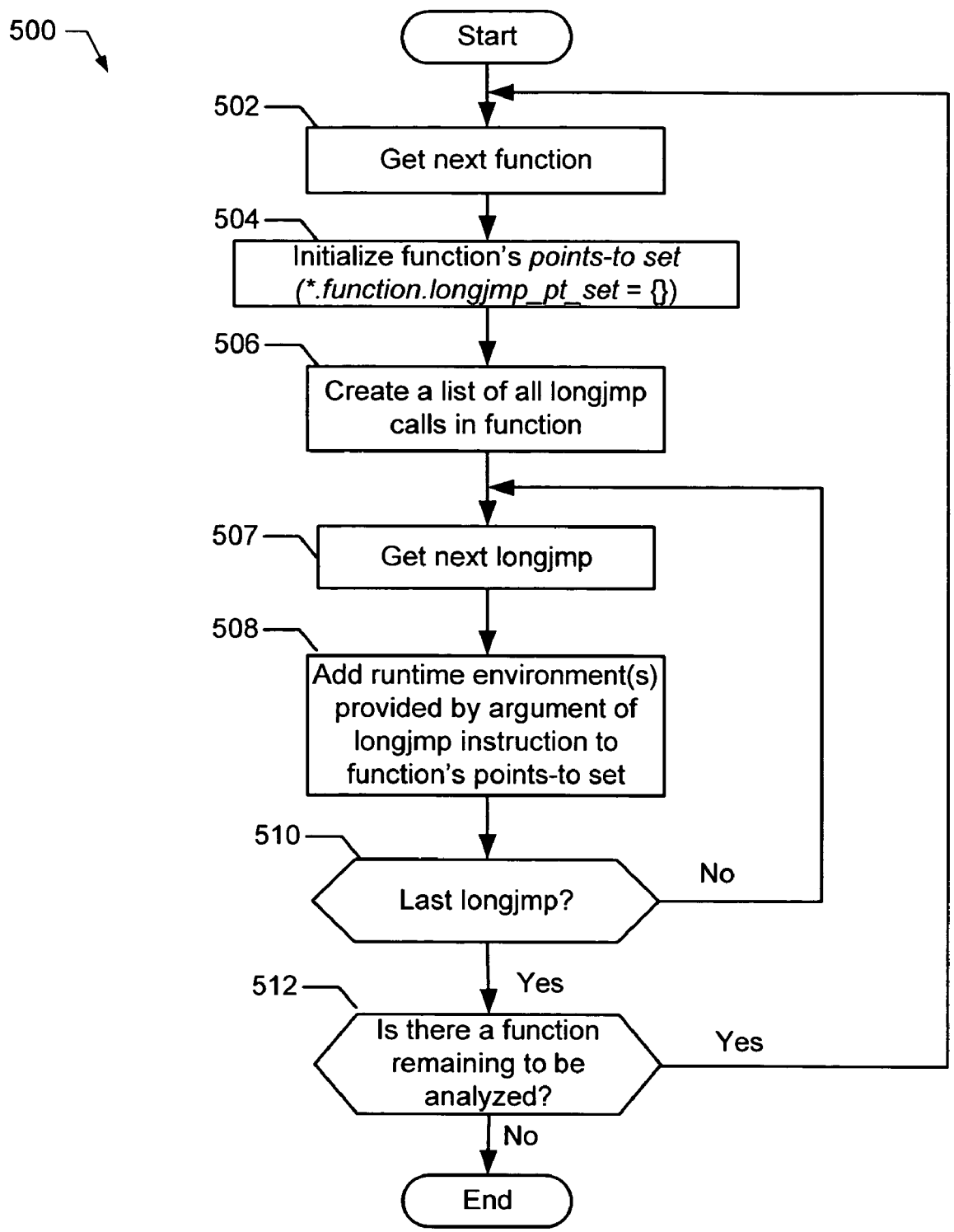
FIG. 5 is a flowchart representative of example machine accessible instructions which may be executed by a device to implement the summary phase analysis block of FIG. 4.

The example summary phase analysis 500 of FIG. 5 begins by analyzing a first function (e.g., function A) in the set of program instructions 301 (block 502). The summary phase module 304 initializes a points-to set for the first function A (i.e., A.function.longjmp_pt_set (the various points-to sets are represented generically by *.function.longjmp_pt_set such that the points-to set of function A is represented by A.function.longjmp_pt_set) to the empty set (e.g., A.function.longjmp_pt_set={ }). The points-to set for the function A is structured to store the runtime environment(s) associated with the function A.

After the points-to set A.function.longjmp_pt_set is initialized (block 504), the summary phase module 304 populates that set with the runtime environment(s) associated with function A. In the illustrated example, the points-to set is populated by analyzing the function A to create a list of restore and return instructions (e.g., longjmp instructions) and the setjmp buffer pointer(s) env associated with each of the restore and return instructions (e.g., env is an argument of the longjmp function) (block 506). The summary phase module 304 then enters a loop defined by blocks 507, 508, 510 where it uses the results of the points-to analysis to add the runtime environments(s) associated with the restore and return instructions to the points-to set for the function A (i.e., to A.function.longjmp_pt_set) (block 508). In other words, the points-to set of the function A is updated in accordance with the following equation: A.function.longjmp_pt_set=A.function.longjmp_pt_set∪Points-To(env) (block 508). As a result, the points-to set for the function A (i.e., A.function.longjmp_pt_set) includes the runtime environment(s) that may be restored by the restore and return instruction(s) (e.g., the longjmp instruction(s)) in function A.

The summary phase module 304 then analyzes the list of restore and return instruction (e.g., longjmp instruction) calls to determine if there are remaining restore and return instruction (e.g., longjmp instruction) calls in the function A to be analyzed (block 510). If there are restore and return instruction calls within the list that have not been analyzed (block 510), control returns to block 507. If there are no restore and return instruction calls to be analyzed (block 510), the summary phase module 304 then determines if there is a function remaining in the set of program instructions 301 to be analyzed (block 512). If there is a function remaining to be analyzed (block 512), control returns to block 502 where the process is performed for the new function (e.g., for function B, a new points-to set B.function.longjmp_pt_set is initialized to an empty set (block 504), and the control proceeds through blocks 506-508 and 510 with respect to the new function B and the new points-to set B.function.longjmp_pt_set.). When all of the functions have been analyzed such that a points-to set (*.Function.longjmp_pt_set) has been created for each function in the program instructions 301, control returns to block 406 of FIG. 4.

After the summary phase analysis is completed (block 404), the propagation phase module 306 begins the propagation phase analysis (block 406). An example propagation phase analysis is shown in FIG. 6.

Figure 6:
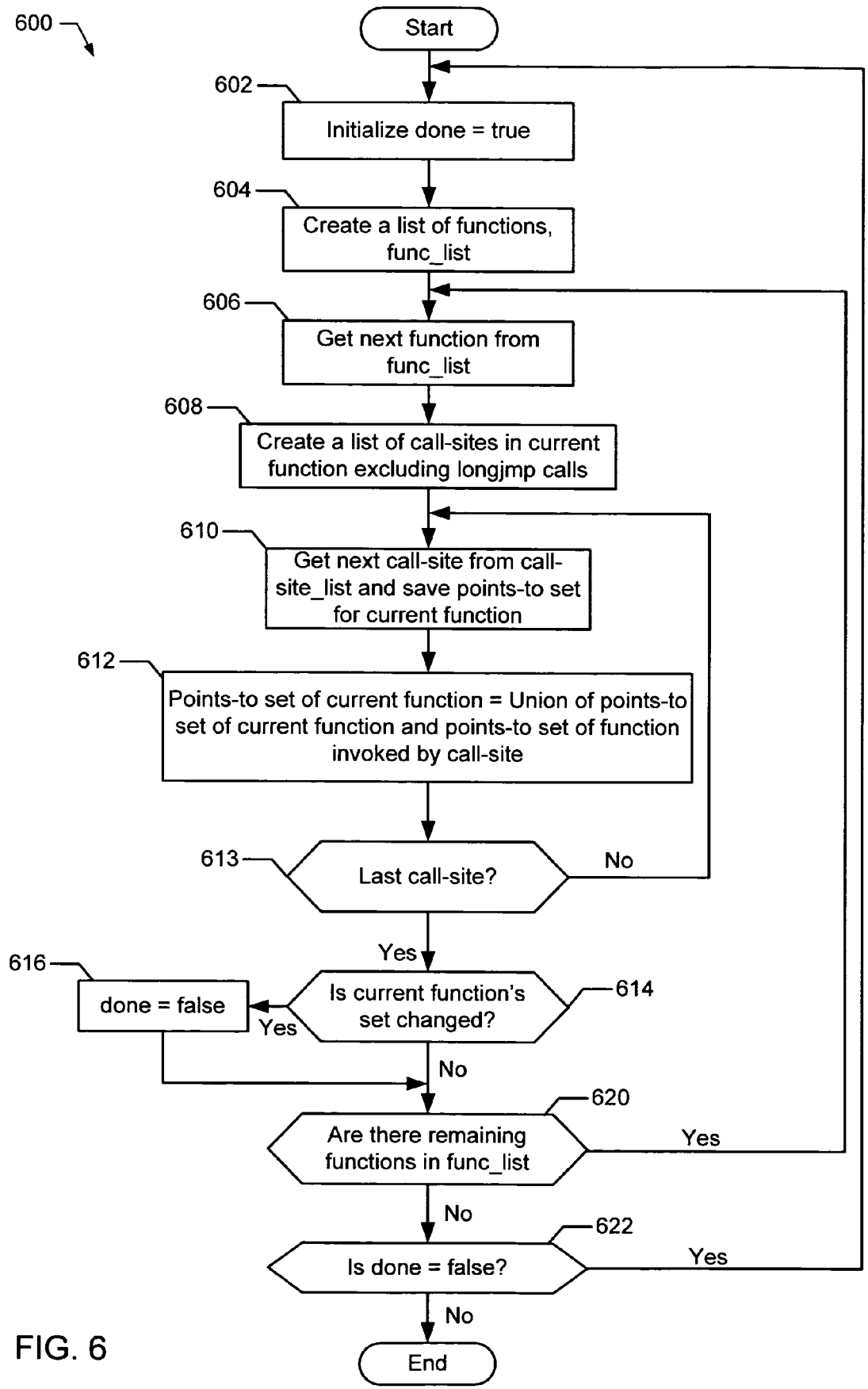
FIG. 6 is a flowchart representative of example machine accessible instructions which may be executed by a device to implement the propagation phase analysis block of FIG. 4.

The example propagation phase analysis 600 of FIG. 6 begins by initializing a variable done to a predetermined state (e.g., done=true) (block 602) and creating a list of functions within the set of program instructions 301 (e.g., a func_list) (block 604). The propagation phase module 306 examines the first function (e.g., function A) in the func_list (block 606) and creates a list of call-sites within the first function A which exclude restore and return instruction (e.g., longjmp instruction) calls (e.g., a call-site_list) (block 608). The first call-site (e.g., call-site C) in the call-site_list is retrieved (block 610). A points-to set corresponding to the function invoked by the first call-site (e.g., C.function.longjmp_pt_set) is also retrieved from the results of the summary phase analysis (block 610). (C.function" in C.function.longjmp_pt_set" indicates the function invoked by the call-site C.) In addition, the contents of the points-to set associated with the first function A (e.g., A.function.longjmp_pt_set) are retrieved and a copy of the points-to set associated with the first function A is saved for later use as explained below (block 610). The propagation phase module 306 updates a working copy of the points-to set for the first function A (e.g., A.function.longjmp_pt_set) to include the points-to set for the function invoked by the first call-site C (e.g., C.function.longjmp_pt_set). In other words, the working copy of the points-to set for the first function A is updated in accordance with the following equation: A.function.longjmp_pt_set=C.function.longjmp_pt_set ∪ A.function.longjmp_pt_set) (block 612).

The propagation phase module 306 then determines whether every call-site in the call-site_list has been processed (block 613). If not, control returns to block 610 where the next call-site is retrieved and processed as explained above (but another unmodified copy of the points-to set for the function is not retrieved or stored, since only one unmodified copy is needed). As a result, the points-to set associated with the first function A (e.g., A.function.longjmp_pt_set) is updated to include all the runtime environments associated with the call-sites within the function A.

When all of the call-sites in the function have been processed (block 613), control advances to block 614. The points-to set A.function.longjmp_pt_set as updated at block 612 is then compared to the copy of the unmodified points-to set list for the first function A stored at block 610. Based on the comparison, the propagation phase module 306 determines if the contents of the points-to set A.function.longjmp_pt_set have been changed (block 614). If the contents of the points-to set A.function.longjmp_pt_set have changed, the value of the variable done is set to false (block 616) and control advances to block 620. If the contents of the points-to set A.function.longjmp_pt_set have not changed, the value of the variable is not changed, and control advances to block 620 without traversing block 616.

At block 620, the propagation phase module 306 determines whether there are any remaining functions to examine. If there is a remaining function to examine (block 620), control returns to block 606. If there are no remaining functions to examine (block 620), the propagation phase module 306 examines the value of the variable done (block 622). If the value of the variable done is false (block 622), control returns to block 602. In other words, if the points-to set of any function has changed, control returns to block 602 where the done variable is reset to true and the analysis is repeated for all of the functions. If none of the points-to sets have changed (block 622), control advances to block 408 of FIG. 4.

After the propagation phase analysis is completed (block 406), the control flow graph module 308 reviews the set of program instructions 301 to generate a control flow graph that represents the set of program instructions 301 (block 408). Persons of ordinary skill in the art will readily appreciate that there are several known methods to generate a control flow graph and any of these methods may be used by the control flow graph module 308. The control flow graph is then used by the application phase module 410 to perform an application phase analysis (block 410). An example process for performing an application phase analysis is shown in FIG. 7.

Figure 7:
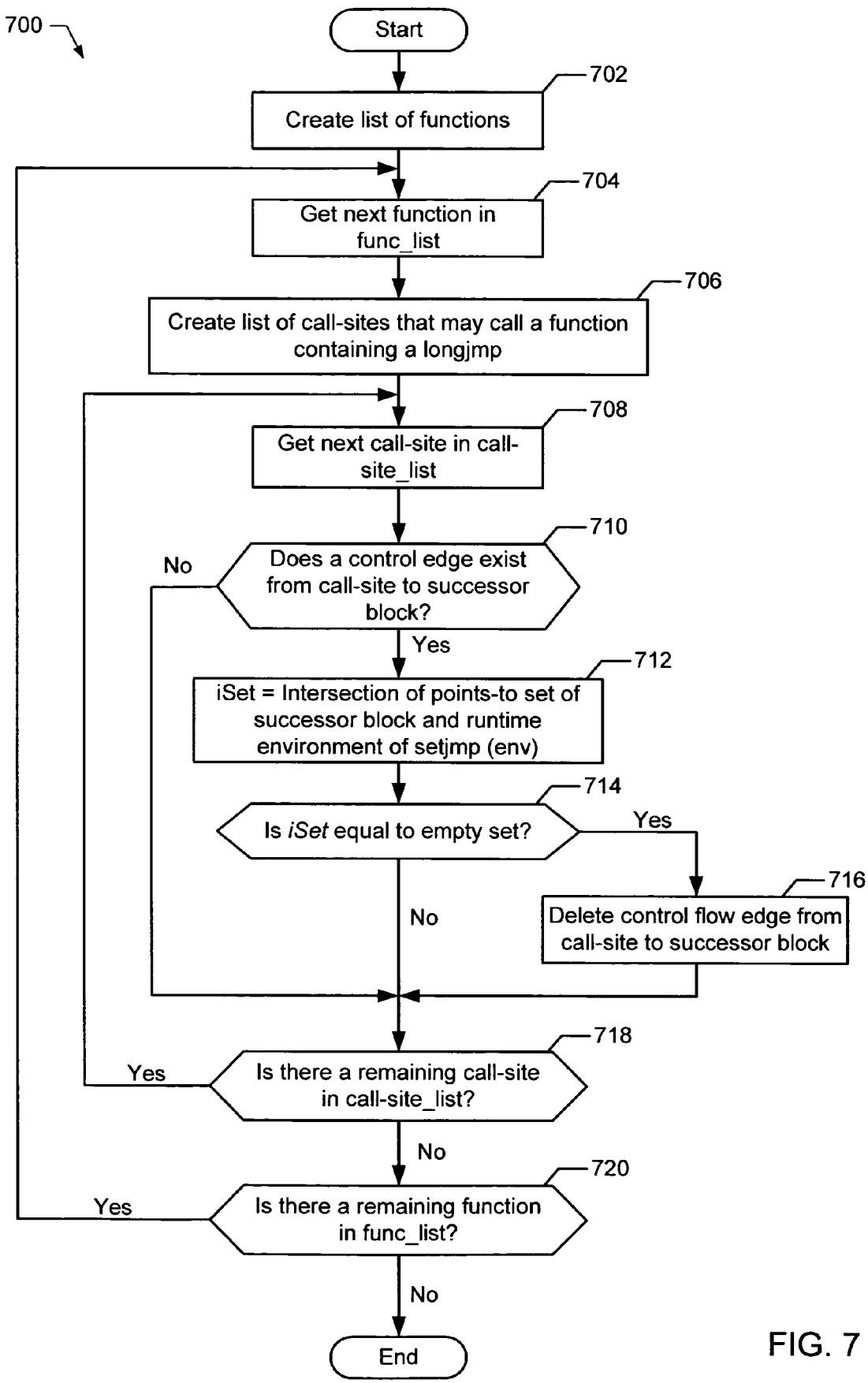
FIG. 7 is a flowchart representative of example machine accessible instructions which may be executed by a device to implement the application phase analysis block of FIG. 4.

When, the example application phase analysis 700 of FIG. 7 begins, the application phase module 310 creates a list of functions present in the set of program instructions (e.g., a func_list) (block 702). The first function in the list (e.g., function A) is then examined (block 704). The application phase module 310 then creates a list of call-sites within the function A (e.g., a call-site_list) that may call a function containing a longjmp instruction (block 706) and begins to examine the first such call-site (e.g., call-site C) in the call-site_list (block 708).

The application phase module 310 then examines the control flow graph generated in block 408 of FIG. 4 to determine if a directed edge exists from the first call-site C to one or more successor blocks (block 710). To this end, the application phase module 310 may analyze the directed edges leaving a node representing the call-site to determine if the destination of the directed edge is a successor block. If a directed edge does not exist between the call-site C and a successor block (block 710), control advances to block 718. Otherwise, the application phase module 310 determines an intersection of the points-to set of the function invoked by the call-site (e.g., for call-site C, the points-to set is C.function.longjmp_pt_set) and the runtime environment env corresponding to the setjmp instruction preceding the successor block (e.g., iSet=C.function.longjmp_pt_set∩envA) (block 712).

The application phase module 310 then determines if the intersection set (e.g., iSet) is an empty set (e.g., is iSet={ }?) (block 714). If the iSet is not an empty set (block 714), the application phase module 310 determines the directed edge cannot be removed and control advances to block 718. If the iSet is an empty set (block 714), the application phase module 310 determines the directed edge is unnecessary, and the application phase module 310 sends an instruction to the control flow graph module 308 to delete the directed edge from the call-site C to the successor block from the control flow graph (block 716). Control then advances to block 718.

At block 718, the application phase module 310 determines if there are any remaining call-sites to analyze. If so, control returns to block 708. If, on the other hand, there are no remaining call-sites to analyze (i.e., all of the call-sites in the call-site list have been analyzed)(block 718), control advances to block 720.

At block 720, the application phase module 310 determines if there are any remaining functions to analyze. If so, control returns to block 704. If, on the other hand, there are no remaining functions to analyze (i.e., all of the functions in the function list have been analyzed)(block 720), the process of FIG. 7 and, thus, the process of FIG. 4 has completed.

To further illustrate the example process 400 of FIG. 4, the example process 400 will now be applied to the example program 100 of FIG. 1. During the summary phase of the example process 400 (e.g., block 404), the summary phase module 302 determines the points-to sets associated with each of the functions in the example program 100 (e.g., main( ), foo( ), and bar( )). The resulting points-to sets are main.longjmp_pt_set={ }

$$foo.\text{longjmp\_pt\_set} = \text{Points} - \text{To}(env\_foo)$$
$$= \{envA\}$$

$$bar.\text{longjmp\_pt\_set} = \text{Points} - \text{To}(env\_bar1) \cup \text{Points} - \text{To}(env\_bar2)$$
$$= \{envA\} \cup \{envB\}$$
$$= \{envA, envB\}$$

During the propagation phase of the example process 400 (e.g., block 406), the propagation phase module 306 analyzes the function main( ) and determines there are two call-sites within the function main( ) that have a non-empty points-to set (e.g., foo( ) and bar( )). The points-to set associated with the function main( ) is updated to include the non-empty points-to sets. The resulting points-to set is shown below.

$$main.\text{longjmp\_pt\_set} = \{foo.\text{longjmp\_pt\_set} \cup bar.\text{longjmp\_pt\_set}\}$$
$$= \{\{\text{Points} - \text{To}(env\_foo)\} \cup$$
$$\{\text{Points} - \text{To}(env\_bar1) \cup$$
$$\text{Points} - \text{To}(env\_bar2)\}\}$$
$$= \{\{envA\} \cup \{envA, envB\}\}$$
$$= \{envA, envB\}$$

During the application phase, the application phase module 310 analyzes the control flow graph 200 of FIG. 2 and determines that both foo( ) and bar( ) may invoke a longjmp instruction. By analyzing the control flow graph 200 the application phase module 310 determines there are two directed edges from foo( ) to successor blocks (e.g., the basic blocks 116, 122 of FIG. 1). As described above, the application phase module 310 calculates the iSet for each successor block as shown below.

$$iSet1 = \{foo.\text{longjmp\_pt\_set} \cap \{envA\}\}$$
$$= \{\text{Points} - \text{To}(env\_foo) \cap \{envA\}\}$$
$$= \{\{envA\} \cap \{envA\}\}$$
$$= \{envA\}$$

$$iSet2 = \{foo.\text{longjmp\_pt\_set} \cap \{envB\}\}$$
$$= \{\text{Points} - \text{To}(env\_foo) \cap \{envB\}\}$$
$$= \{\{envA\} \cap \{envB\}\}$$
$$= \{\}$$

The application phase module 310 determines the directed edge 204 of FIG. 2 is not needed because iSet2 equals the empty set and instructs the control flow module 308 to delete the directed edge 204 of FIG. 2.

The application phase module 310 continues by examining the directed edges from bar( ) to the successor blocks (e.g., the basic blocks 116, 122) and calculates the iSet for each successor block as shown below.

$$iSet1 = bar.\text{longjmp\_pt\_set} \cup \{envA\}$$
$$= \{\text{Points} - \text{To}(env\_bar1) \cup \text{Points} - \text{To}(env\_bar2)\} \cap \{envA\}\}$$
$$= \{\{envA, envB\} \cap \{envA\}\}$$
$$= \{envA\}$$

$$iSet2 = \{bar.\text{longjmp\_pt\_set} \cup \{envB\}\}$$
$$= \{\text{Points} - \text{To}(env\_bar1) \cup \text{Points} - \text{To}(env\_bar2)\} \cap \{envB\}\}$$
$$= \{\{envA, envB\} \cap \{envA\}\}$$
$$= \{envB\}$$

Figure 8:
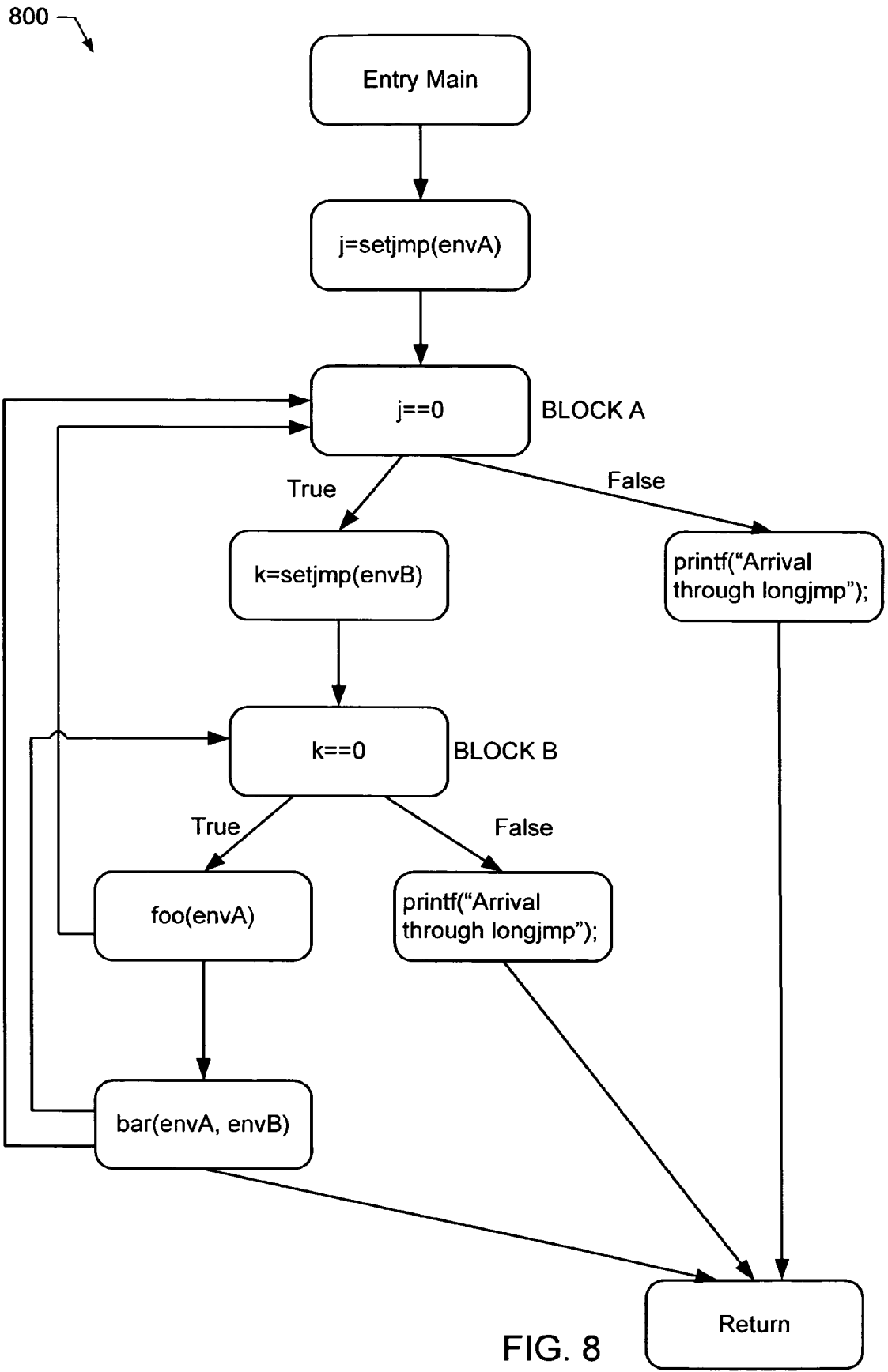
FIG. 8 is an example control flow graph that may be generated by the example apparatus of FIG. 3 and/or the machine accessible instructions of FIGS. 4-7.

The application phase module 310 does not instruct the control flow graph module 308 to delete any directed edges associated with bar( ) because neither iSet1 nor iSet2 are equal to the empty set. The resulting control flow graph 800 is illustrated in FIG. 8.

FIG. 9 is a block diagram of an example computer system which may execute the machine accessible instructions represented by the flowcharts of FIGS. 4, 5, 6, and/or 7 to implement the apparatus 300 of FIG. 3. The computer system 900 may be a personal computer (PC) or any other computing device. In the illustrated example, the computer system 900 includes a main processing unit 902 powered by a power supply 904. The main processing unit 902 may include a processor 906 electrically coupled by a system interconnect 908 to a main memory device 910, a flash memory device 912, and one or more interface circuits 914. In an example, the system interconnect 908 is an address/data bus. Of course, a person of ordinary skill in the art will readily appreciate that interconnects other than busses may be used to connect the processor 906 to the other devices 910, 912, and 914. For example, one or more dedicated lines and/or a crossbar may be used to connect the processor 906 to the other devices 910, 912, and 914.

The processor 906 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 906 may include any type of well known cache memory, such as static random access memory (SRAM). The main memory device 910 may include dynamic random access memory (DRAM) and/or any other form of random access memory. For example, the main memory device 910 may include double data rate random access memory (DDRAM). The main memory device 910 may also include non-volatile memory. In an example, the main memory device 910 stores a software program that is executed by the processor 906 in a well known manner. The flash memory device 912 may be any type of flash memory device. The flash memory device 912 may store firmware used to boot the computer system 900.

The interface circuit(s) 914 may be implemented using any type of well known interface standard, such as an Ethernet interface and/or a Universal Serial Bus (USB) interface. One or more input devices 916 may be connected to the interface circuits 914 for entering data and commands into the main processing unit 902. For example, an input device 916 may be a keyboard, mouse, touch screen, track pad, track ball, isopoint, and/or a voice recognition system.

One or more displays, printers, speakers, and/or other output devices 918 may also be connected to the main processing unit 902 via one or more of the interface circuits 914. The display 918 may be a cathode ray tube (CRT), a liquid crystal displays (LCD), or any other type of display. The display 918 may generate visual indications of data generated during operation of the main processing unit 902. The visual indications may include prompts for human operator input, calculated values, detected data, etc.

The computer system 900 may also include one or more storage devices 920. For example, the computer system 900 may include one or more hard drives, a compact disk (CD) drive, a digital versatile disk drive (DVD), and/or other computer media input/output (I/O) devices.

The computer system 900 may also exchange data with other devices 922 via a connection to a network 924. The network connection may be any type of network connection, such as an Ethernet connection, digital subscriber line (DSL), telephone line, coaxial cable, etc. The network 924 may be any type of network, such as the Internet, a telephone network, a cable network, and/or a wireless network. The network devices 922 may be any type of network devices 922. For example, the network device 922 may be a client, a server, a hard drive, etc.

In addition, persons of ordinary skill in the art will appreciate that, although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A computer-implemented method comprising:
    creating a points-to set associated with a function in a computer program;
    determining if a control flow edge between: (1) a call-site associated with a restore and return instruction and (2) a successor block following the call-site is removable from a control flow graph representing the computer program; and
    removing the control flow edge between the call-site and the successor block if it is determined that the control flow edge is removable,
    wherein determining if the control flow edge may be removed comprises:
    (a) creating an intersection set comprising an intersection of the points-to set associated with the function called by the call-site and a runtime environment associated with the restore and return instruction associated with the call-site; and
    (b) determining if the intersection set satisfies a condition.

2. A computer-implemented method as defined in claim 1 wherein creating the points-to set comprises:
    creating a first points-to set associated with a first function in the computer program, the first points-to set comprising a first runtime environment, wherein the first runtime environment is associated with a restore and return instruction in the first function; and
    updating the first points-to set to include a second runtime environment associated with a non-restore and return instruction.

3. A computer-implemented method as defined in claim 2, wherein the first runtime environment comprises at least one of a variable value, an object value, a stack pointer value, or a register values.

4. A computer-implemented method as defined in claim 2, wherein the restore and return instruction is a longjmp instruction.

5. A computer-implemented method as defined in claim 4, wherein a pointer to a setjmp buffer storing the first runtime environment is an argument to the longjmp instruction.

6. A computer-implemented method as defined in claim 2, wherein the restore and return instruction is configured to restore the first runtime environment and to return control to a block following a predetermined instruction.

7. A computer-implemented method as defined in claim 6, wherein the predetermined instruction is configured to save the first runtime environment.

8. A computer-implemented method as defined in claim 6, wherein the predetermined instruction is a setjmp instruction.

9. A computer-implemented method as defined in claim 8, wherein a pointer to a setjmp buffer is an argument to the setjmp instruction.

10. A computer-implemented method as defined in claim 1, wherein the condition is the intersection set is an empty set.

11. An apparatus comprising:
    a points-to set creator to create a points-to set associated with a function in a computer program;
    an application phase module to determine if a control flow edge between: (1) a call-site associated with a restore and return instruction and (2) a successor block following the call-site is removable from a control flow graph representing the computer program, the application phase module is to determine if the control flow edge between the call-site and the successor block following the call-site may be deleted from the control flow graph by: (a) creating an intersection set comprising an intersection of the points-to set associated with the function called by the call-site and a runtime environment associated with the restore and return instruction associated with the call-site, and (b) determining if the intersection set satisfies a condition; and a control flow graph module responsive to the application phase module to remove the control flow edge between the call-site and the successor block, at least one of the points-to set creator, the application phase module, and the control flow graph module being implemented by a processor.

12. An apparatus as defined in claim 11 wherein the points-to set creator comprises:

a summary phase module to create a first points-to set associated with a first function in the computer program, the first points-to set comprising a first runtime environment, wherein the first runtime environment is associated with a restore and return instruction in the first function; and a propagation phase module to update the first points-to set to include a second runtime environment associated with a non-restore and return instruction.

13. An apparatus as defined in claim 12, wherein the first runtime environment comprises at least one of a variable value, an object value, a stack pointer value, or a register values.

14. An apparatus as defined in claim 12, wherein the restore and return instruction is a longjmp instruction.

15. An apparatus as defined in claim 14, wherein a pointer to a setjmp buffer storing the first runtime environment is an argument to the longjmp instruction.

16. An apparatus as defined in claim 12, wherein the restore and return instruction is configured to restore the first runtime environment and to return control to a block following a predetermined instruction.

17. An apparatus as defined in claim 16, wherein the predetermined instruction is configured to save the first runtime environment.

18. An apparatus as defined in claim 16, wherein the predetermined instruction is a setjmp instruction.

19. An apparatus as defined in claim 18, wherein a pointer to a setjmp buffer is an argument to the setjmp instruction.

20. An apparatus as defined in claim 11, wherein the condition is the intersection set is an empty set.

21. A tangible machine accessible storage medium storing machine executable instructions which, when executed, cause a machine to:

create a points-to set associated with a function in a computer program;

determine if a control flow edge between: (1) a call-site associated with a restore and return instruction and (2) a successor block following the call-site may be removed from a control flow graph representing the computer program; and remove the control flow edge between the call-site and the successor block if it is determined that the control flow edge is removable, wherein the machine executable instructions cause the machine to determine if the control flow edge is removable by:

(a) creating an intersection set comprising an intersection of the points-to set associated with the function called by the call-site and a runtime environment associated with the restore and return instruction associated with the call-site; and (b) determining if the intersection set satisfies a condition.

22. A tangible machine accessible storage medium as defined in claim 21 wherein the machine executable instructions cause the machine to create a points-to set by:

creating a first points-to set associated with a first function in the computer program, the first points-to set comprising a first runtime environment, wherein the first runtime environment is associated with a restore and return instruction in the first function; and updating the first points-to set to include a second runtime environment associated with a non-restore and return instruction.

23. A tangible machine accessible storage medium as defined in claim 21, wherein the condition is the intersection set is an empty set.

24. A system comprising:

a memory storing a computer program; and a processor to execute the computer program to create a points-to set associated with a function in a computer program; determine if a control flow edge between: (1) a call-site associated with a restore and return instruction and (2) a successor block following the call-site is removable from a control flow graph representing the computer program by (a) creating an intersection set comprising an intersection of the points-to set associated with the function called by the call-site and a runtime environment associated with the restore and return instruction associated with the call-site; and (b) determining if the intersection set satisfies a condition; and to remove the control flow edge between the call-site and the successor block if it is determined that the control flow edge is removable.

25. A system as defined in claim 24 wherein the memory comprises SRAM.

* * * * *